(12) United States Patent
Ivarsson et al.

(10) Patent No.: US 11,440,344 B2
(45) Date of Patent: Sep. 13, 2022

(54) WHEEL LOCKING DEVICE

(71) Applicant: RIMGARD SWEDEN AB, Solna (SE)

(72) Inventors: Lars Ivarsson, Stockholm (SE); Marcus Ekström, Hägersten (SE)

(73) Assignee: RIMGARD SWEDEN AB, Solna (SE)

(*) Notice: Subject to any disclaimer, the term of this patent is extended or adjusted under 35 U.S.C. 154(b) by 0 days.

(21) Appl. No.: 17/608,262

(22) PCT Filed: Jun. 14, 2021

(86) PCT No.: PCT/US2021/037167
§ 371 (c)(1),
(2) Date: Nov. 2, 2021

(87) PCT Pub. No.: WO2021/252992
PCT Pub. Date: Dec. 16, 2021

(65) Prior Publication Data
US 2022/0144012 A1 May 12, 2022

Related U.S. Application Data

(60) Provisional application No. 63/038,449, filed on Jun. 12, 2020.

(51) Int. Cl.
*E05B 7/00* (2006.01)
*B60B 7/16* (2006.01)
(Continued)

(52) U.S. Cl.
CPC .............. *B60B 7/16* (2013.01); *B60B 7/0013* (2013.01); *B60B 7/066* (2013.01); *B60B 2900/3318* (2013.01)

(58) Field of Classification Search
CPC ......... B60B 7/16; B60B 7/0013; B60B 7/066; B60B 2900/3318; B60B 27/065;
(Continued)

(56) References Cited

U.S. PATENT DOCUMENTS 3,170,733 A * 2/1965 Lamme ..................... B60B 7/16
                                                              301/37.38
4,631,936 A * 12/1986 Minami ................. E05B 53/006
                                                              70/230
(Continued)

FOREIGN PATENT DOCUMENTS

JP         56008702 A  *  1/1981  ............. B60B 37/00
JP         56008703 A  *  1/1981  ............. B60B 37/00
(Continued)

OTHER PUBLICATIONS

International Search Report and Written Opinion dated Oct. 7, 2021, from International Application No. PCT/US2021/037167, 11 pages.

*Primary Examiner* — Suzanne L Barrett
(74) *Attorney, Agent, or Firm* — Meunier Carlin & Curfman LLC (57) ABSTRACT

A locking device for locking a wheel of a vehicle is provided, where the device comprising a main module adapted to be attached to a rim of the wheel and configured to cover nuts or bolts that attach the wheel to the vehicle, a tubular center bolt having a threated outer surface and configured to adapt a lock cylinder, the tubular center bolt being further adapted to be connected to the main module via an insert sleeve; and at least one threaded element permanently assembled within a center bore or behind the rim; wherein the tubular center bolt is configured to be threadedly attached to the at least one threaded element to attach the locking device onto the wheel, and wherein the lock cylinder is configured to be arranged in a locking state within the center bolt in which the center bolt is prevented from rotating relative to the main module and the at least one threaded element, and in an open state in which the lock cylinder allows the center bolt to rotate relative to the main module and the at least one threaded element.

11 Claims, 5 Drawing Sheets

(51) Int. Cl.
  *B60B 7/06* (2006.01)
  *B60B 7/00* (2006.01)
(58) Field of Classification Search
  CPC . E05B 77/44; E05B 73/00; E05B 7/00; B60R 25/00; Y10T 70/26
  USPC .......................................................... 70/260
  See application file for complete search history.

(56) References Cited

U.S. PATENT DOCUMENTS

| | | | |
|---|---|---|---|
| 4,825,669 | A | 5/1989 | Herrera |
| 5,941,105 | A * | 8/1999 | Macey .................... B60R 25/09 70/225 |
| 8,739,585 | B2 | 6/2014 | Sims |
| 8,943,865 | B1 | 2/2015 | Bullock et al. |
| 9,689,180 | B2 | 6/2017 | Ivarsson |
| 10,486,461 | B1 | 11/2019 | Ivarsson et al. |
| 2009/0267405 | A1 | 10/2009 | Ballard |
| 2017/0232786 | A1 * | 8/2017 | Hickey ................... E05B 73/00 70/260 |
| 2018/0186179 | A1 * | 7/2018 | Chen ........................ B60B 7/16 |
| 2018/0319209 | A1 * | 11/2018 | Chung ..................... B60B 7/18 |
| 2019/0256043 | A1 * | 8/2019 | Price ........................ B60B 7/16 |
| 2019/0366761 | A1 | 12/2019 | Ivarsson et al. |

FOREIGN PATENT DOCUMENTS

| | | | |
|---|---|---|---|
| WO | WO-2019233649 A1 * | 12/2019 | ............. B60B 3/165 |
| WO | 2021/113380 | 6/2021 | |
| WO | 2021/113386 | 6/2021 | |

* cited by examiner

WHEEL LOCKING DEVICE

CROSS REFERENCE TO RELATED APPLICATIONS

This application is a U.S. national application of international application PCT/US2021/037167 filed on Jun. 14, 2021 and which claims priority of U.S. provisional patent application No. 63/038,449 filed on Jun. 12, 2020, the content of both of which are incorporated herein by reference.

FIELD OF THE INVENTION

This invention relates to a technology for preventing unauthorized removal of car wheels. More specifically, a locking device with alternative attachment options for car wheels is disclosed.

BACKGROUND OF THE INVENTION

Unauthorized removal of car parts, specifically alloy wheels, is a frequently occurring problem all over the world. Due to their high value, custom wheels and tire rims are examples of items frequently stolen. Accordingly, there is a great need for devices and techniques for protecting wheels from unauthorized removal.

There have been attempts to provide such protection. For example, US patent numbers U.S. Pat. Nos. 8,739,585 and 8,943,865 disclose antitheft devices for car wheels. These devices can be removed relatively easily by an experienced thief and thus do not provide a truly reliable wheel lock. U.S. Pat. Nos. 9,689,180 and 10,486,461 issued to the inventors of this application provide devices for securing wheels. Similarly, patent publications WO/2021/113380 and WO/2021/113386 of the inventors provide further alternatives for devices to secure wheel. The devices described in these publications are attached to the wheel hub such that the inner wall of the wheel hub is a fixing point for the device. However, because the geometry and volume within the center bore of a wheel varies between car makes and models, e.g., due to geometrical variations in the wheel, wheel hubs, and axle shafts, one solution is not suitable for all makes and models. Therefore, there is a need to provide different solutions to ensure a safe and effective installation depending on conditions given.

Moreover, all the existing solutions provide systems that are not permanent in a sense that the locking devices such as disclosed in the above-mentioned patent literature has to be installed again every time the wheel is taken off, for example for tire change. Accordingly, there is a need for a locking device that has an attachment system that allows more permanent installation.

SUMMARY OF THE INVENTION

In view of the above, this application provides alternative solutions for securing the wheels and protecting all the wheel lugs. The invention provides alternative solutions for securing the wheels through the center bore of the wheel rim in a manner that alleviates the problem of a need to reassemble each element of the locking device each time the locking device is opened for wheel removal, for example for tire change. The invention provides a locking device with three alternative means to attach the common elements onto the wheel. The common feature of the alternatives is that the center bolt is attached on the wheel via at least one threaded element permanently assembled within the center bore of the rim or behind it. The attachment system is to be chosen from the alternatives based on the specifics of the car make and model.

Hence, it is an object of this invention to provide a locking device for locking a wheel of a vehicle is provided where the device comprises a main module (5) adapted to be attached to a rim (6) of the wheel and configured to cover nuts or bolts that attach the wheel to the vehicle; a tubular center bolt (9) having a threaded outer surface (9b) and configured to adapt a lock cylinder (12), the tubular center bolt (9) being further adapted to be connected to the main module (5) via an insert sleeve 8; and at least one threaded element (4,10, 14) permanently assembled within a center bore of the rim (2) or behind the rim (6); wherein the tubular center bolt (9) is configured to be threadedly attached to the at least one-threaded element (4,10,14) to attach the locking device onto the wheel, and wherein the lock cylinder (12) is configured to be arranged in a locking state within the center bolt (9) in which the center bolt (9) is prevented from rotating relative to the main module (5) and the at least one threaded element (4,10,14), and in an open state in which the lock cylinder (12) allows the center bolt (9) to rotate relative to the main module (5) and the at least one threaded element (4, 10, 14).

According to certain aspects the insert sleeve (8) of the locking device as described above has a pattern (16) on its outer surface and the main module (5) has a matching pattern (18) on an inner surface of a center hole (17) of the main module (5), and the matching patterns are configured to prevent the insert sleeve (8) to turn inside the main module when the patterns (16, 18) are mated.

According to certain aspects the locking device as described above at least one threaded element (4,10,14) permanently assembled within the center bore of the rim (2) or behind the rim (6) is a threaded joint element (10) consisting of an inner ring (10b) and an outer ring (10b) configured to be attached together within a center bore (2) of the rim, wherein the inner ring (10b) has a threaded inner surface (10c) onto which the center bolt (9) is threadedly attached.

According to certain aspects in the threaded joint element 10 as described above the outer ring (10a) has a non-circular geometrical pattern (10d) on its inner surface, and the inner ring (10b) has a matching non-circular geometrical pattern (10e) on its outer surface, and the non-circular geometrical patterns (10d,10e) match such as to connect the rings (10a, 10b) together to form the joint element (10).

According to certain aspects of the locking device, the main module (5) has a non-circular geometrical pattern (5a) on a bottom surface around the center hole (17) and the non-circular geometrical pattern (5a) on the bottom surface matches the non-circular geometrical pattern (10e) of the inner surface of the outer ring, whereby the main module can be attached to the joint element by pressing the matching geometrical patterns together. According to certain aspects the main module (5) does not have the non-circular geometrical pattern but has an even bottom surface.

According to certain aspects the geometrical patterns of the inner (10b) and outer (10a) rings of the joint element (10) are selected from pentagonal or hexagonal forms.

According to certain aspects the inner and outer rinds of the joint elements as described above are attached together magnetically; the inner ring (10b) is of metal and the outer ring (10a) is magnetized material and the rings (10a, 10b) are attached together magnetically.

According to certain aspects the locking device comprises at least one threaded element (4,10,14) permanently assembled within the center bore of the rim (2) or behind the rim (6) and the element is an integrated joint element (14) being a threaded assembly in the wheel bore (2) and the center bolt (9) is adapted to threadedly connect to the integrated joint element.

According to certain aspects the integrated joint (14) has a non-circular geometric pattern (14a), preferably a pentagonal or hexagonal pattern. According to certain aspects the pattern is recessed into the center part of the wheel.

According to certain aspects the locking device has a non-noncircular geometric pattern (14a), preferably a pentagonal or hexagonal pattern and the main module (5) has a matching non-circular geometrical pattern (5a) on a bottom surface around the center hole (17), and the main module (5) can be attached to the integrated joint element (14) by pressing the matching geometrical patterns (5a, 14a) together.

According to certain aspects the locking device has at least one threaded element (4,10, 14) permanently assembled within the center bore of the rim (2) or behind the rim (6) is a shaft connector (4) having a threaded inner surface (4a), the threaded inner surface being adapted to be partially threaded on a shaft nut (3) of a car and to threadedly connect the center bolt (9) via the threaded outer surface (9b) of the center bolt to the shaft connector.

It is another object of this invention to provide a method to attach a wheel locking device of claim 1, wherein the center bolt (9) is threadedly attached to at least one threaded element (4, 10, 14) permanently assembled within the center bore (2) or behind a wheel rim (6), and wherein the threaded element (4,10,14) is selected from a joint element (10) having an inner and an outer ring (10b, 10a) assembled into a center bore (2), an integrated joint element (14) manufactured into a center part of the rim, and a shaft connector (4) threadedly attached to a shaft nut (3) of the wheel.

According to another aspect, in the device of the previous aspect the at least one threaded element may be a threaded axle shaft and a shaft connector, or a threaded joint point comprising at least one threaded ring permanently assembled behind the rim. The joint point may comprise two threaded rings one of which is permanently assembled behind the rim.

SHORT DESCRIPTION OF THE FIGURES

The above, as well as additional objects, features and advantages of the present invention, will be better understood through the following illustrative and non-limiting detailed description, with reference to the appended claims. In the drawings, like reference numerals are used for like elements unless stated otherwise.

FIG. 1 shows the common elements of the locking device of all aspects of the invention. The figure shows a lock cylinder 12 with a patterned ridge 12a and a stud 12b, a center bolt 9, cylindrical outward extension of the center bolt 9a, threaded outer surface of the center bolt 9b, slot in the inner surface of the center bolt 9c, an insert sleeve 8, pattern on the inner surface of the insert sleeve 15, pattern on the outer surface of the insert sleeve 16, main module 5, center hole of the main module 17, pattern on the inner side of the center hole of main module 18, and engaging element of the main module 7.

FIG. 5c. (old 4c) Shows a bottom side of the main module 5. The center hole 17 of the main module is shown. In this alternative embodiment there is a non-circular geometrical pattern 5a around the center hole. In certain embodiments this geometrical pattern is not present.

DETAILED DESCRIPTION OF THE INVENTION

Figure 1:
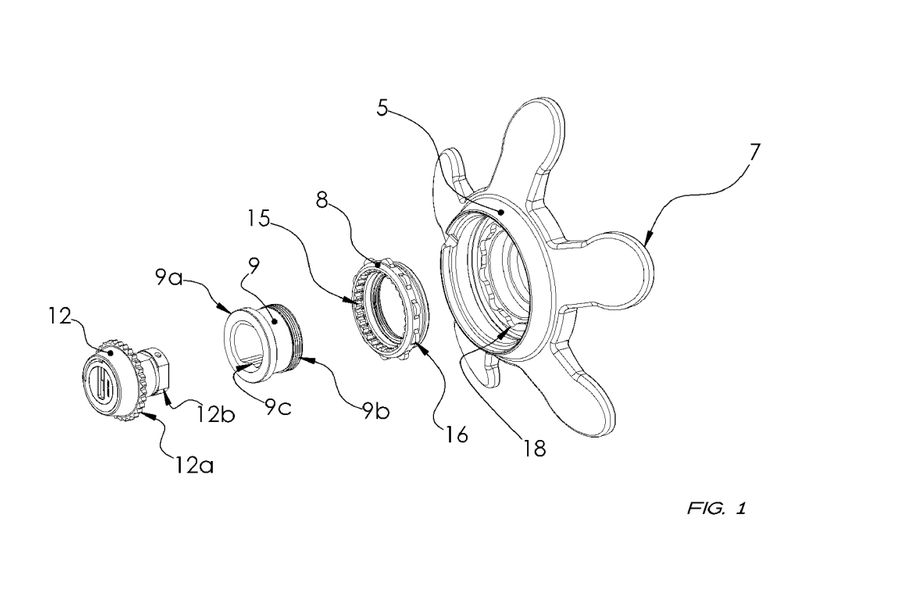
Figure 2:
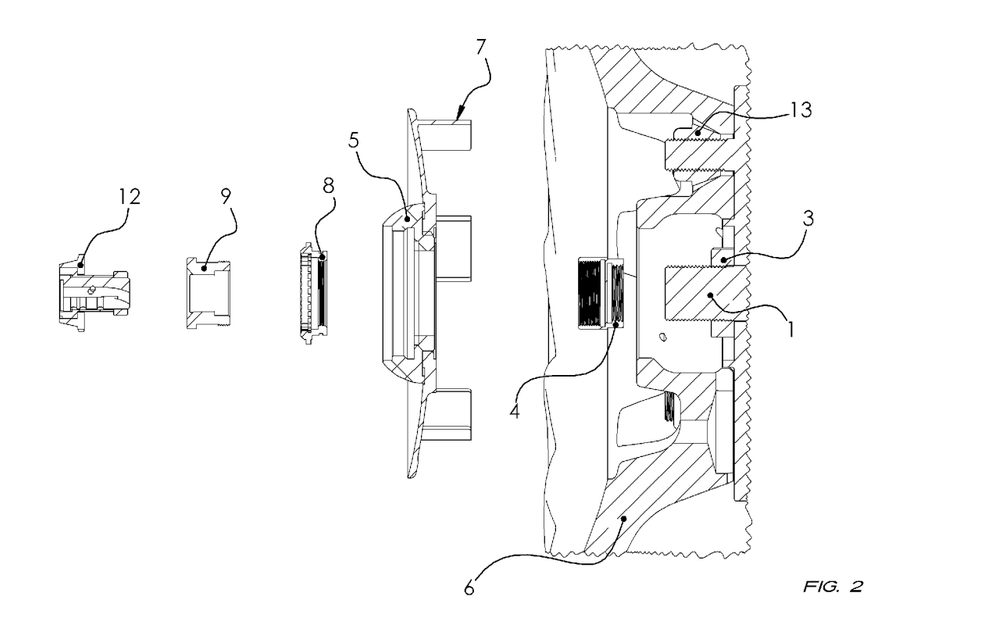
FIG. 2 is a cross sectional view of a wheel installed onto an axle shaft of a car that has a threaded shaft nut 3 and the axle shaft 1 extend through the shaft nut. The figure shows a lock cylinder 12, a center bolt 9, an insert sleeve 8, a main module 5 with engagement elements 7, the main module 5 is to be attached to the axle shaft 1 via a threaded axle shaft connector 4. Details of the lock cylinder 12, center bolt 9, insert sleeve 8, and main module 5 are similar as described in FIG. 1, although the details are not shown here.

FIG. 1 illustrates components that are common for each embodiment of the locking device of this disclosure. The locking device of this disclosure always comprises a main module 5 adapted to cover the nuts and bolts with which the wheel is attached. The bottom side of the main module may be flat (not shown), or it may have a non-circular geometrical pattern 5a as is shown in FIG. 5c. The main module may be of any geometrical shape. FIG. 1 shows a shape with radially extending elements where the tips of these elements are engaging elements 7 engaging with the rim 6. In FIG. 2 the engaging elements 7 are on edges of the circular main module 5. The shape of the main module depends on the geometry of the wheel and the location of the lugs or bolts. Even if these two shapes shown in the figures are the most preferred ones, any other suitable shape is possible. The engaging elements 7 engage the main module 5 to the rim 6 of the wheel and prevents the main module 5 from rotating relative to the rim. The main module 5 comprises a center hole 17, which has a pattern 18 on surface of its inner side. The pattern may comprise protrusions 18a and recesses 18b. Other type of pattern is possible as long as the pattern fulfils its function to match with the pattern on outer side 16 of the insert sleeve 8.

Still referring to FIG. 1, the locking device of this disclosure always includes a lock cylinder 12. The lock cylinder may comprise a keyhole accessible from one side of the cylinder and a lock stud 12b extending outward from the cylinder. The lock cylinder 12 has a patterned ridge 12a circularly extending from its outer side. The lock cylinder has at least one lock stud 12b. The lock cylinder may for example be Abloy Assa-series, but any other suitable lock cylinder will be possible also.

Further referring to FIG. 1, the device of this disclosure always includes a center bolt 9. The center bolt 9 is a cylindrical tube-like element having two open ends. The center bolt is configured to adapt the lock cylinder 12 within it. The center bolt 9 has a cylindrical outward extension 9a at one end and at least partially threaded outer surface 9b at the other end. The patterned ridge 12a of the lock cylinder is configured to rest on the cylindrical outward extension 9a of the center bolt 9 and the pattern of the ridge mates to the internal pattern of the sleeve 15 when the lock cylinder 12 is inserted into the center bolt 9. The inner side of the center bolt 9 has at least one slot 9c. The lock cylinder 12 can be turned inside the center bolt 9 such that the at least one stud 12b occupies the at least one slot 9c, thereby locking the lock cylinder 12 into the center bolt 9. The center bolt 9 may have slots that are configured to enable maneuvering the bolt with a tool fitting in the slots (not shown).

Still referring to FIG. 1, the device of this disclosure always includes an insert sleeve 8. The insert sleeve is a cylindrical element having an inner surface with pattern 15 and an outer surface with pattern 16. The patterns may be protrusions and recesses or any other type of uneven formations that match the pattern 18 of the pattern on the surface of the inner side of the center hole 17 of the main module 5. The pattern may comprise protrusions spaced by recesses forming the pattern. The insert sleeve 8 is configured to allow the center bolt 9 partially slide through the insert sleeve such that the threaded outer surface 9b of the center bolt 9 extends through the insert sleeve 8. The threads of the outer side of the insert sleeve are configured to be attached to a permanently fixed threaded element that is assembled within the center bore or the rim 2 or behind the rim of the wheel 6. The alternative options to attach the device comprising the elements shown in FIG. 1 via threading the center bolt to a fixed threaded element are described below.

Figure 3:
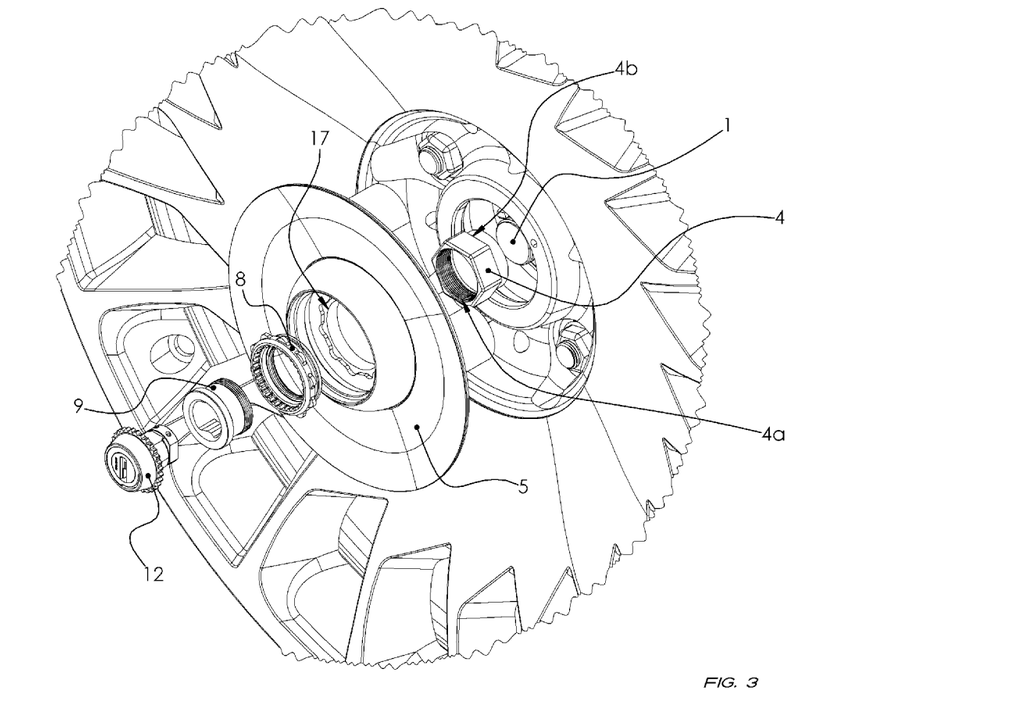
FIG. 3 is an isotropic view of an arbitrary wheel installed on an arbitrary car's wheel axle and the locking device is shown. The figure shows a lock cylinder 12, a center bolt 9, an insert sleeve 8, a main module 5, center hole of the main module 17, a shaft connector 4, and the axle shaft 1.
Figure 4:
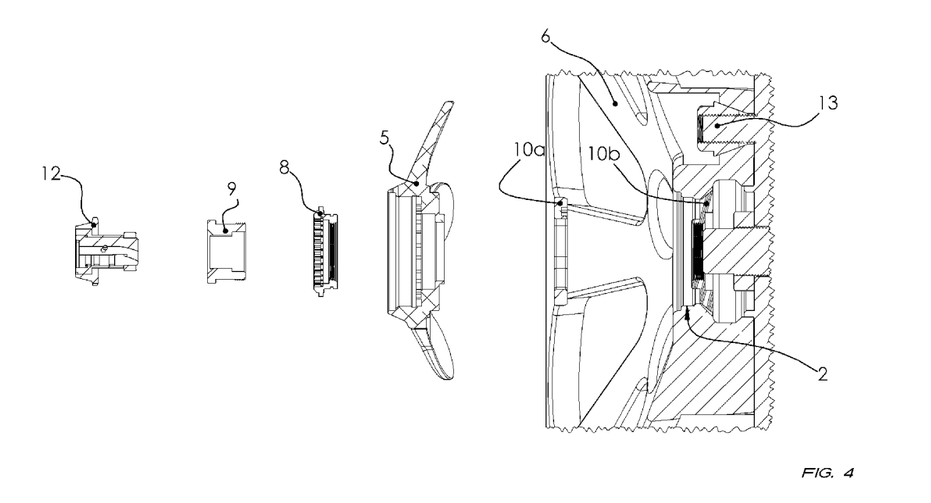
FIG. 4 is an exploded cross-sectional view of a wheel locking device using a joint element consisting of two parts and installed from both sides of the rim (inner side and outer side) into the center bore. The figure shows a lock cylinder 12, a center bolt 9, an insert sleeve 8, a main module 5, an outer ring 10a and an inner ring 10b of the joint element. The figure also shows the wheel rim 6, and the wheel lugs 13. The inner ring and outer ring are attached together so that the joint element having both of the rings is assembled into the center bore 2. Details of the lock cylinder 12, center bolt 9, insert sleeve 8, and main module 5 are similar as described in FIG. 1, although the details are not shown here.

FIGS. 2 and 3 show the device where permanently fixed threaded element within a center bore of the rim 2 or behind the rim of the wheel 6 is an axle shaft connector 4. The axle shaft connector 4 is a circular element having a threaded inner side 4a and having one or more flat surfaces 4b on its outer side. The axle shaft connector 4 is dimensioned such that the threads 4a at one end of the connector 4 match with threads of an axle shaft 1 and the threads of the other end of the connector 4 match the threads 9b of the outer surface of the center bolt 9. This way the center bolt attaches the main module to the permanently fixed threaded element which is the shaft connector that connects the system to the axle shaft.

This embodiment is suitable to be used in vehicles where the axle shaft of the vehicle axle is extending from the wheel hub and therefore occupies the space within the wheel hub. When the axle shaft is threaded the wheel locking device can be fastened to the axle shaft with the shaft connector shown in FIGS. 2 and 3. The shaft connector supplies the axle shaft with a fixed joint point to attach the locking device. FIGS. 2 and 3 show the main module 5 having the engagement elements 7 engaging the main module 5 with the wheel rim and preventing it becoming loosened from the axle shaft connector.

FIGS. 4, and 5a-c illustrate the device in a case where the permanently fixed threaded element within the center bore 2 or behind the rim of the wheel 6 is an inner ring 10b of a two-part joint element 10. The joint element 10 consists of two rings: the inner ring 10b and the outer ring 10a. The inner ring 10b has a threaded inner side 10c configured to be threaded on a threaded tip of a shaft nut 3 in car models having a threaded shaft nut. The inner ring 10b has an outer surface that has a non-circular geometrical pattern 10d, e.g., a tetragonal, pentagonal etc. pattern. The outer ring 10a has an inner surface having a pattern 10e matching the outer surface pattern 10d of the inner ring 10b. The outer ring 10a is assembled from the outer side of the rim (i.e., the side that faces away from the car), through the center bore 2, such that outer ring 10a is pressed or attached on top of the inner ring 10b and the geometrical patterns (10d, 10e) of the inner ring's outer surface and the outer ring's inner surface match together and lock the two rings to one joint element 10. The rings may be attached together magnetically, the inner ring 10a is metallic and the outer ring 10b is magnetized. The attachment may also be snapping, or adhesives or any other suitable method. The main module 5 in this case has also a matching pattern 5a on its bottom side around the center hole 17 of the main module, so that the main module 5 is pressed to attach it to the pattern of the outer ring 10e.

Figure 5A:
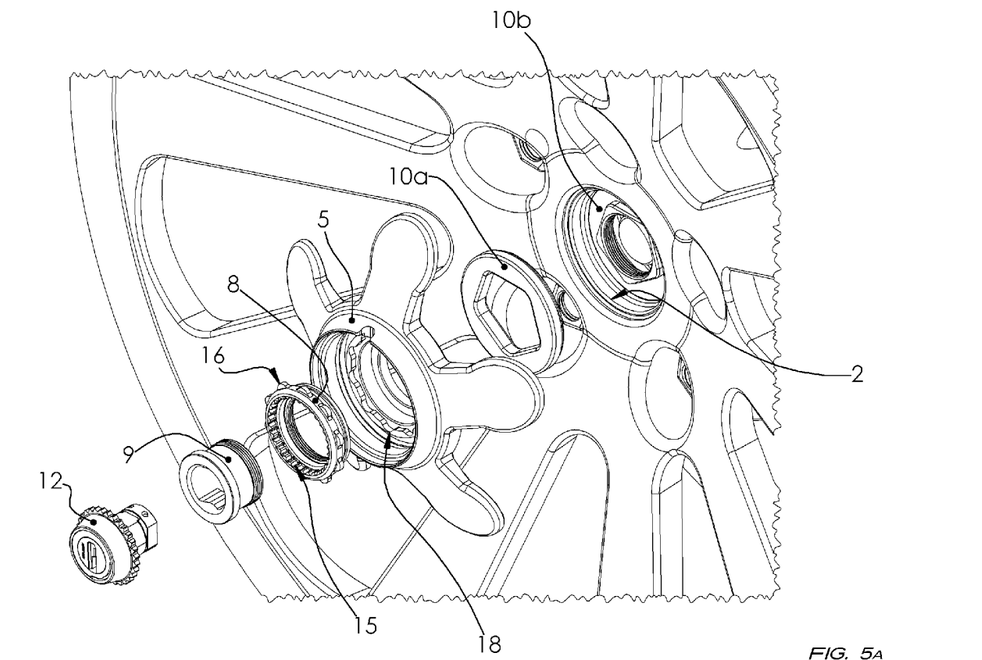
FIG. 5a is an exploded isometric view of a wheel locking device with a joint element consisting of two parts. The figure shows a lock cylinder 12, a center bolt 9, an insert sleeve 8, a main module 5, an outer ring 10a, and an inner ring 10b. The internal and external patterns (15, 16, respectively) of the insert sleeve 8 are shown, as well as the pattern 18 of the main module 5. The joint element is installed from both sides of the rim into the center bore 2.
Figure 5B:
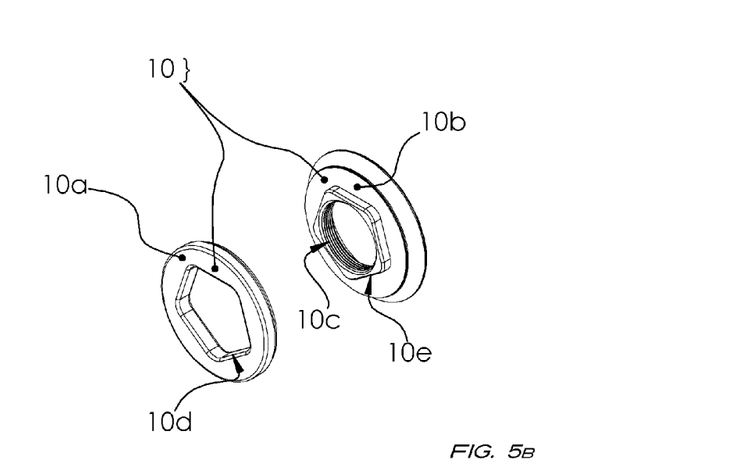
FIG. 5b shows joint element 10 consisting of an outer ring 10a, and an inner ring 10b. The inner and outer rings together form the joint element. The figure shows a non-circular geometrical form of the inner surface of the outer ring 10d, and the matching non-circular geometrical form of the outer surface of the inner ring 10e. The threaded inner surface 10c of the inner ring is also shown.
Figure 5C:
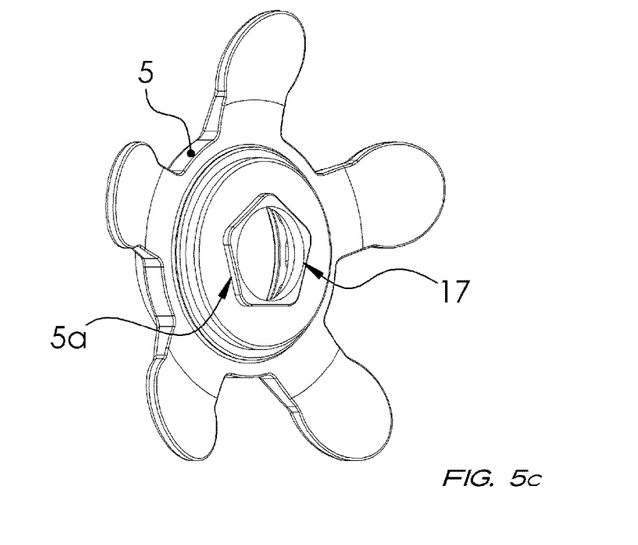

As can be seen from FIG. 5a, the main module 5 is to be connected to the outer ring 10a which is to be connected to inner ring 10b within the center bore 2. The insert sleeve 8 slides through the center hole 17 of main module 5 and attaches with the main module 5 due to the matching pattern 18 of the inner side of the center hole and the pattern on outer side 6 of the insert sleeve 8. The center bolt 9 is inserted through the main module's center hole 17 such that the threaded outer surface 9b of the center bolt 9 is threaded to the threads 10c of the inner side of the inner ring 10b. The lock cylinder 12 fits inside the center bolt 9 and locks the center bolt in place. The locking device is so configured that when the main module 5 is placed on the wheel rim mating with the geometric pattern of the joint element (10d,10e), it also aligns with the pattern of the lugs and nuts of the wheel and covers them and makes them inaccessible without removing the main module. The geometry of the main module engages with the geometry of the wheel when the engaging elements 7 engage the main module to the rim and thereby prevent rotation relative to the rim.

The insert sleeve 8 connects to the main module and allows the center bolt to align with the same axis as the wheel and installed joint element 10. The insert sleeve also distributes the clamp force caused by tightening the main module to the wheel with the center bolt into the joint.

For fastening purposes as well as for antitheft, the joint element 10 may not rotate relative to any other part of the wheel lock. This requirement is fulfilled by the matching non-circular patterns on the inner ring, outer ring, and the main module. The patterns allow the joint element to stay fixed when tightening the center bolt. It will also prevent the main module to be loosened with the lock cylinder is in place.

Figure 6:
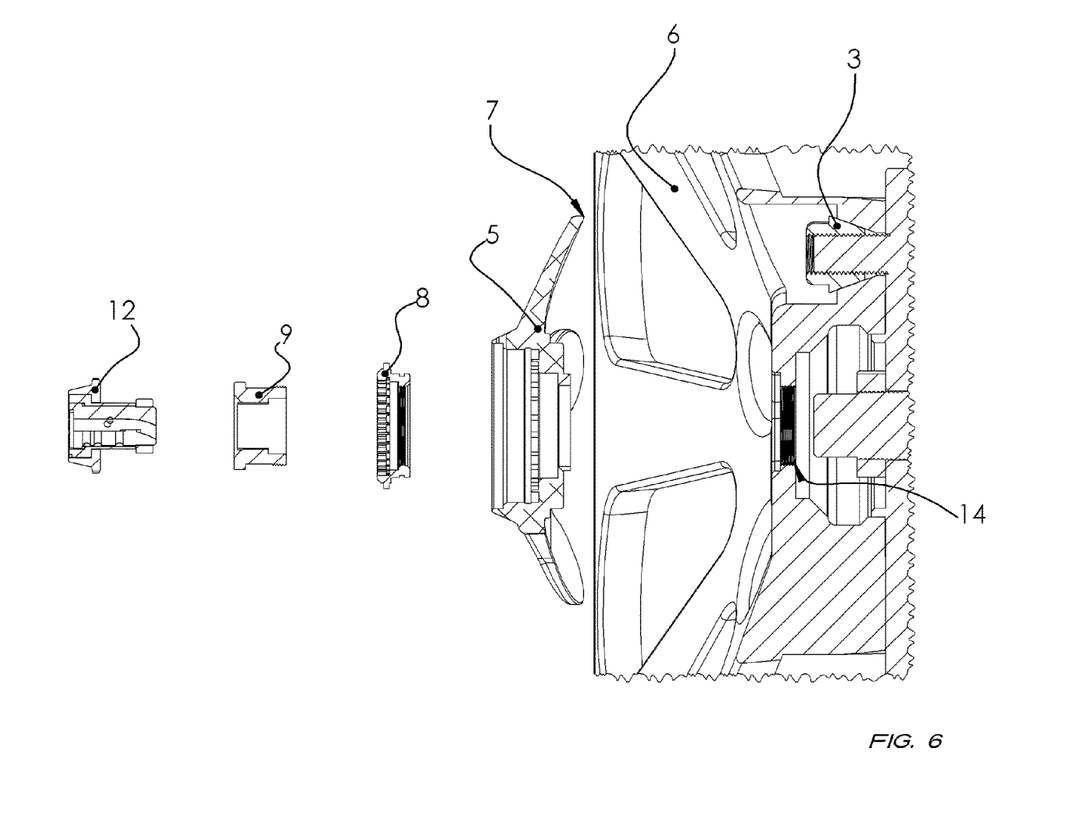
FIG. 6 shows an exploded cross-sectional view of a wheel lock device installed to an integrated joint element in a wheel rim. The figure shows a lock cylinder 12, a center bolt 9, an insert sleeve 8, a main module 5, a threaded integrated joint point 14 recessed into the center part of the wheel. Details of the lock cylinder 12, center bolt 9, insert sleeve 8, and main module 5 are similar as described in FIG. 1, although the details are not shown here.
Figure 7:
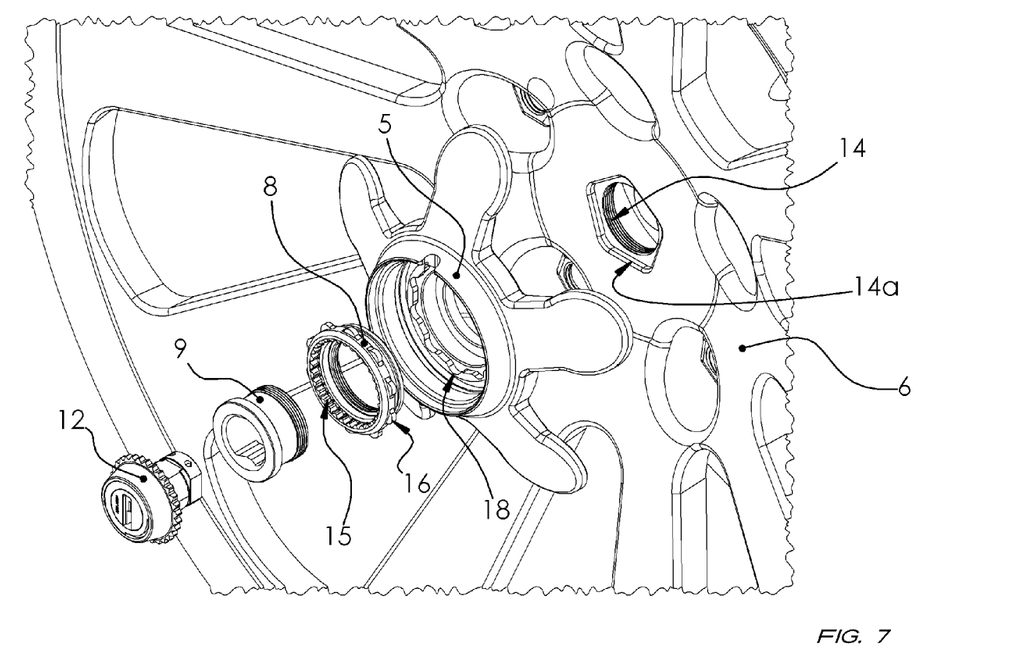
FIG. 7 shows an isometric view of a wheel lock device installed to an integrated joint element of the wheel. The figure shows a rim 6, a lock cylinder 12, a center bolt 9, an insert sleeve 8 having internal and external patterns (15 and 16, respectively), a main module 5, and threated integrated joint element 14.

Referring now to FIGS. 6 and 7, a locking device is disclosed where an the permanently fixed threaded element within the center bore 2 or behind the rim 6 is an integrated joint element 14. The integrated joint element 14 is made by a mechanical bond e.g., threaded assembly in the wheel bore. The integrated joint element provides threading into the inner face of the wheel bore, and it also provides a non-circular geometric pattern (e.g., pentagonal, hexagonal etc.) 14a, which pattern may be recessed into the center part of the wheel. The main module 5 has a non-circular geometric pattern 5a (shown in FIG. 5b) on its bottom side around the center hole 17, which geometric pattern matches the geometric pattern 14a of the joint element. The locking device is attached to the wheel rim in similar way as is described above when the joint element is formed of two rings 10a and 10b. The center bolt 9 is used to tighten or loosen the main module 5 to or from the wheel. The threading 9b on the outer surface of the center bolt 9 matches the threading 15a of the inner side of the integrated joint.

ELEMENT LIST 1 axle shaft
2 center bore
3 shaft nut
4 shaft connector
4a threaded inner side of the shaft connector
4b one or more flat surfaces on the outer surface of the shaft connector
5 main module
5a geometrical pattern on the bottom side of the main module around the center hole
6 wheel rim
7 engaging element
8 insert sleeve
9 center bolt
9a cylindrical outward extension of the center bolt
9b threaded outer surface
9c slot in the inner surface of the center bolt
10 joint element
10a outer ring
10b inner ring
10c threaded inner side of the inner ring
10d non-circular geometrical pattern of the inner surface of outer ring
10e non-circular geometrical pattern of the outer surface of the inner ring
12 Lock cylinder
12a patterned ridge of the lock cylinder
12b lock stud
13 wheel lugs
14 integrated joint element
14a noncircular geometrical pattern of the integrated joint element
15 inner surface of the insert sleeve with pattern (also called internal pattern)
16 outer surface of the insert sleeve with pattern (also called external pattern)
17 center hole of main module
18 pattern on the inner side of the center hole of main module
18a protrusion of the pattern 18
18b recess of the pattern 18

What is claimed is:

1. A locking device for locking a wheel of a vehicle, the device comprising:
    a main module adapted to be attached to a rim of the wheel and configured to cover nuts or bolts that attach the wheel to the vehicle;
    a tubular center bolt having a threaded outer surface and configured to adapt a lock cylinder, the tubular center bolt being further adapted to be connected to the main module via an insert sleeve; and
    at least one threaded element permanently assembled within a center bore or behind the rim; wherein
    the tubular center bolt is configured to be threadedly attached to the at least one threaded element to attach the locking device onto the wheel, and
    wherein the lock cylinder is configured to be arranged in a locking state within the center bolt in which the center bolt is prevented from rotating relative to the main module and the at least one threaded element, and in an open state in which the lock cylinder allows the center bolt to rotate relative to the main module and the at least one threaded element.

2. The device of claim 1, wherein the insert sleeve has a pattern on an outer surface and the main module has a matching pattern on an inner surface of a center hole of the main module, and the matching patterns are configured to prevent the insert sleeve to turn inside the main module when the patterns are mated.

3. The device of claim 1, wherein the at least one threaded element permanently assembled within the center bore or behind the rim is a threaded joint element consisting of an inner ring and an outer ring configured to be attached together within the center bore of the rim, wherein the inner ring has a threaded inner surface onto which the center bolt is threadedly attached.

4. The device of claim 3, wherein the outer ring has a non-circular geometrical pattern on an inner surface, and the inner ring has a matching non-circular geometrical pattern on an outer surface, and the non-circular geometrical patterns match such as to connect the rings together to form the joint element.

5. The device of claim 4, wherein the main module has a non-circular geometrical pattern on a bottom surface around the center hole and the non-circular geometrical pattern on the bottom surface matches the non-circular geometrical pattern of the inner surface of the outer ring, whereby the main module can be attached to the joint element by pressing the matching geometrical patterns together.

6. The device of claim 3, wherein the inner ring is of metal and the outer ring is magnetized material and the rings are attached together magnetically.

7. The device of claim 1, wherein the at least one threaded element permanently assembled within a center bore or behind the rim is an integrated joint element being a threaded assembly in a wheel bore and the center bolt being adapted to threadedly connect to the integrated joint element.

8. The device of claim 7, wherein the integrated joint has a non-circular geometric pattern, preferably a pentagonal or hexagonal pattern, which pattern is recessed into a center part of the wheel.

9. The device of claim 8, wherein the main module has a non-circular geometrical pattern on a bottom surface around the center hole and the non-circular geometrical pattern on the bottom matches the non-circular geometric pattern of the integrated joint element, whereby the main module can be attached to the integrated joint element by pressing the matching geometrical patterns together.

10. The device of claim 1, wherein the at least one threaded element permanently assembled within a center bore or behind the rim is a shaft connector having a threaded inner surface, the threaded inner surface being adapted to be partially threaded on a shaft nut of a car and to threadedly connect the center bolt via the threaded outer surface of the center bolt to the shaft connector.

11. A method to attach a wheel locking device of claim 1, wherein the center bolt is threadedly attached to at least one threaded element permanently assembled within the center bore or behind a wheel rim, and wherein the threaded element is selected from a joint element having an inner and an outer ring assembled into a center bore, an integrated joint element manufactured into a center part of the rim, and a shaft connector threadedly attached to a shaft nut of the wheel.

* * * * *